United States Patent [19]

Heim et al.

[11] E Re. 31,193

[45] Reissued Mar. 29, 1983

[54] THERMOSETTING HEAT BONDABLE LACQUER

[75] Inventors: Peter Heim, Basel; Karl Borer, Grindel; Werner Alleman, Breitenbach, all of Switzerland

[73] Assignee: Schweizerische Isola-Werke, Switzerland

[21] Appl. No.: 299,801

[22] Filed: Sep. 8, 1981

Related U.S. Patent Documents

Reissue of:

[64] Patent No.: 4,243,778
Issued: Jan. 6, 1981
Appl. No.: 48,400
Filed: Jun. 14, 1979

[30] Foreign Application Priority Data

Jun. 21, 1978 [CH] Switzerland ..... 6765/78

[51] Int. Cl.[3] ..... C08G 71/04; C08L 63/00

[52] U.S. Cl. ..... 525/454; 525/417; 525/908; 525/930; 427/116

[58] Field of Search ..... 525/417, 454, 908, 930

[56] References Cited

U.S. PATENT DOCUMENTS 3,966,683 6/1976 Merten et al. ..... 525/908

FOREIGN PATENT DOCUMENTS 1570552 7/1969 Fed. Rep. of Germany .
1770131 9/1971 Fed. Rep. of Germany .
2054602 3/1972 Fed. Rep. of Germany .
2443252 3/1975 Fed. Rep. of Germany .
1285463 8/1972 United Kingdom .
1424748 2/1976 United Kingdom .

*Primary Examiner*—Paul Lieberman
*Attorney, Agent, or Firm*—Schiller & Pandiscio

[57] ABSTRACT

The thermosetting heat bondable lacquer comprises a solution of a thermosetting mixture of various resins in a solvent or mixture of solvents which boils at a temperature in the range of 50° to 230° C., preferably 130° to 210° C. The thermosetting mixture consists of a polyhydantoin resin, a polyhydroxy polyether or phenoxy resin and a polyurethane resin, each of which must have a pre-determined structure and a pre-determined specific viscosity. The composition of the thermosetting mixture must be within the hatched area in FIG. 1.

The thermosetting heat bondable lacquer can be obtained by mixing solutions of the three resin components and can contain auxiliaries and additives and/or catalysts. If the solvent or mixture of solvents is removed from the heat bondable lacquer, e.g. by drying a thin coating produced therefrom or by precipitation with a non-solvent for the resin components, a mixture which is viscoelastic at room temperature and homogeneous is left, which mixture can be first molten and then cured by supplying heat. The heat bondable lacquer can be used in the production of baking lacquer wires, which serve for the manufacture of electromagnetic coils which can be subjected to high mechanical and thermal stresses, but it can also be applied to other carriers or by converted into heat bondable adhesive powders by precipitation in a non-solvent.

17 Claims, 3 Drawing Figures

FIG. 1
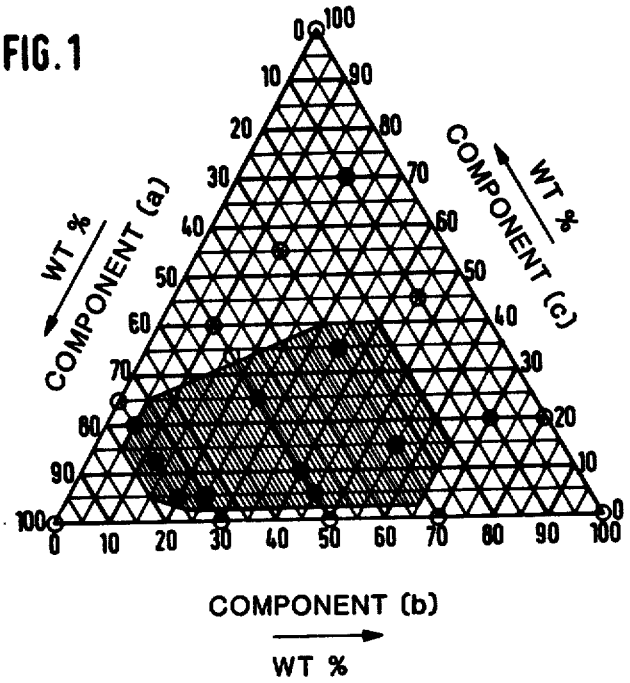
● EXAMPLES ACCORDING TO INVENTION
○ COMPARATIVE EXAMPLES
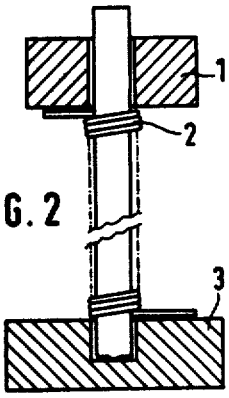
FIG. 2
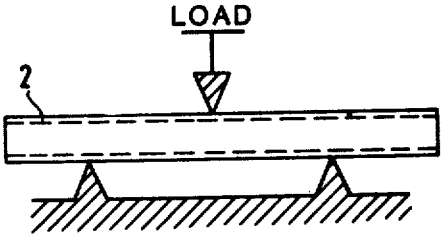
FIG. 3

THERMOSETTING HEAT BONDABLE LACQUER

Matter enclosed in heavy brackets [ ] appears in the original patent but forms no part of this reissue specification; matter printed in italics indicates the additions made by reissue.

The invention relates to a thermosetting heat bondable lacquer. Such products are also called "baking lacquers" and comprise a solution of a thermosetting heat bondable adhesive which, after removal of the solvent, is first bonded and then cured by the so-called baking process, i.e. by supplying heat. The heat bondable lacquer according to the invention consists essentially of a solution of a thermosetting mixture of certain polyhydantoin resins, polyhydroxy polyether resins (also called phenoxy resins) and polyurethane resins in a pre-determined weight ratio and is particularly suitable for coating highly heat stable enamelled wires for coils.

Thus, coils prepared from heat stable, enamelled wires which are coated with the heat bondable lacquer according to the invention can, for example, be baked to form electromagnetic coils which can be exposed to high mechanical and thermal stresses, since the coating melts when sufficient heat is supplied, and is then displaced by simultaneous pressure action, either by the tension applied when winding or by baking in a mold or a compression die, into the cavities between the wires of the coil and cured by chemical cross-linking when more heat is supplied.

Enamelled wires for coils with a heat bondable adhesive coating, which are also called "baking lacquer wires" have been on the market for many years. They are electrically conductive wires which are provided with a lower, normal insulation layer of a common wire lacquer and an upper layer of a heat bondable or baking lacquer. The lower layer (which is also called the ground or base insulation or base lacquer) constitutes the actual insulation and must consist of a material which is, among others, not unfavourably affected by the baking conditions of the heat bondable lacquer layer. The upper layer serves to bond the individual wire turns of a coil together so that a variety of coils for electromagnetic purposes can be produced, without the coils, except in exceptional cases, having to be additionally bonded with an impregnating lacquer. Such coils can be baked under very varying conditions which are adapted to the size and shape of the coils, e.g. by heating in a thermostatic chamber, by supplying hot air during winding or by a current pulse after winding.

The materials known until now as heat bondable adhesives (also called binder or bonding layer) for coating enamelled wires, can be divided into two groups from their behaviour in heat:

A. Thermoplastics which are viscoelastic at normal temperatures (also recently called "plastomers") and which can be reversibly heated to the plastic state as often as desired, without chemical changes.

B. Thermosetting mixtures of thermoplastics (plastomers) which are viscoelastic at normal temperatures and which are converted already by a single application of heat via the plastic state to thermosetting plastics, due to chemical cross-linking (i.e. curing).

The heat bondable adhesives of group A which include thermoplastic synthetic resins such as polyvinyl butyral, polyamides, polyesters etc. are excellent as long as the operating temperature of the merely heat bonded wire coils prepared using these adhesives is below the softening range of the heat bondable adhesive. In the softening range, i.e. in the plastic state, however, the bonding strength of the heat bondable adhesive decreases gravely. This can lead to the coil being deformed and finally falling apart. In group A, therefore, the operating temperature depends among others on the plastic behaviour of the heat bondable adhesive, but the required baking temperature also depends upon the plastic behaviour and this temperature can therefore not be selected as high as desired. Therefore, for the heat bondable adhesives of group A which remain thermoplastic, there is an upper limit for the temperature of use. Despite this, these heat bondable adhesives are still important as there are many fields of use which do not involve high thermal stresses so that no overloads can occur.

The heat bondable adhesives of group B have become particularly interesting in recent years because it was recognized that only when using such thermosetting heat bondable adhesives to prepare baking lacquer wires could coils be produced by the baking process which remain dimensionally stable even when higher mechanical and thermal stresses occur. Entirely new fields of use are therewith opened up for baking lacquer wires, especially in the range which was reserved previously for coils impregnated with impregnating lacquers, in particular for coils for electric motors.

The continuing trend to higher demands being made of the heat stability of coils also additionally favored this development, as today, base lacquers for the enamel insulation of electrically conductive wires are known, which permit operating temperatures of above 200° C. These base insulations can be advantageously coated with thermosetting heat bondable lacquers (baking lacquers) with corresponding endurance heat stability in order to produce baking lacquer wires for the production of coils which can be bonded by baking. The increasing interest in environment protection also favors the use of such heat bondable lacquers since when bonding a coil with impregnating lacquers, as opposed to bonding by baking, quite large amounts of more or less poisonous solvents or reactive diluents are always evaporated either from the interior or from the surface of the liquid.

For thermosetting heat bondable lacquers, the use of the following thermosetting resin mixtures of group B was suggested until now:

Mixtures of epoxides with isocyanates (British Pat. No. 1,285,463),

Mixtures of epoxides with melamine or phenolic resins (Swiss Pat. No. 505,446),

Mixtures of polyethers with copolyamides and isocyanates (British Pat. No. 1,424,743) and Mixtures of polyesterimide urethanes with phenoxy resins (German Offenlegungsschrift No. 24,43,252).

The last of these suggestions has brought the most technical progress. With the heat bondable lacquer described in German Offenlegungsschrift, one can apply coatings to preferably heat stable enamelled wires of heat class F (155° C.) to H (180° C.) without difficulties; like the base insulations, the coatings have good storage stability so that the baking lacquer wires do not change in storage and remain easy to wind and bake. [The above heat classes are defined in Publication 85 (1957) of the Bureau Central de la Commission Electrotechnique Internationale (1, rue de Varembé, Geneva; abbreviated as CEI)]. Practice has also shown that with the heat bondable lacquers of the above mentioned German Offenlegungsschrift, as stated therein, field coils for electric motors of heat class F to H can be produced which behave in operation at least as well as corresponding field coils which are bonded with impregnating lacquers of heat class F to H.

For coils which are exposed to even higher mechanical and/or thermal stresses (e.g. armature coils for electric motors of heat class F to H and higher, field and armature coils for manually operated machine tools, self-supporting coils and coils which are thermally overloaded for a short period at more than 250° C.), even the heat bondable lacquer of German Offenlegungsschrift No. 24,43,252 is not suitable because either the dimensional stability at elevated temperatures or the endurance heat stability in general or the thermal load capacity (burn out) of the coils no longer suffice.

On the other hand, it has been found that particularly with small coils, the shortest baking times possible are desirable so that the coils can be manufactured as economically as possible. However, it would probably be extremely problematical to use a heat bondable lacquer which can be thermally cured within a few minutes by baking for example at 180° C. or even lower temperatures, since such heat bondable lacquers would already at least partly cure when driving off the solvent after coating the enamelled wires, so that subsequent bonding by baking the coils made from the finished baking lacquer wires could no longer be perfectly carried out.

Shorter baking times can therefore be realized much more easily at baking temperatures above 200° C. In this case, however, curing has to take place considerably faster than with the known heat bondable adhesives. Besides this, the base lacquer for the base insulation and the heat bondable lacquer (i.e. the so-called baking lacquer wire system) must be well adapted to each other so that the baking lacquer wire is not damaged at the above-mentioned high baking temperatures. Among others, no cracking under thermal shock should occur and the base insulation should not soften; the heat bondable adhesive must, however, melt quickly and then cross-link clearly faster and more strongly than the thermosetting heat bondable adhesives which were known until now.

When manufacturing larger coils, however, it is difficult to carry out a fast baking because fast heating and cooling of large coil masses is very difficult and, among others, leads to larger mechanical stresses within the coils. As opposed to this, the manufacture of larger coils can be carried out without any problems at milder baking conditions, e.g. by several hours' storage of the coils at temperatures below 200° C., preferably at maximum 180° C., in a thermostatic chamber, and results in coils with very good, optimally balanced properties.

In view of the various baking methods, a thermosetting heat bondable lacquer can only then be used fairly universally for coating enamelled wires if the heat bondable adhesive on the one hand is heat bondable, but relatively slowly curable already at temperatures of about 180° C., and on the other hand can be thermally cured by baking at temperatures above 200° C., preferably at maximum 220° C., as quickly as possible. Heat bondable adhesives which must be baked at temperatures higher than 220° C. are even unsuitable for smaller coils.

These properties are also advantageous for a further processing technology, namely the production of coils of a complex shape which are reformed in several steps, utilizing the plastic deformability of the heat bondable adhesive. As long as the thermosetting baking lacquer wires are only heat bonded, which is possible below 200° C., i.e. as long as the heat bondable adhesive is still capable of plastic deformation, the thermosetting baking lacquer wires can be repeatedly subjected to plastic deformation like the baking lacquer wires remaining thermoplastic, which were used until now. During the final shaping, however, the thermosetting baking lacquer wires can, as opposed to the baking lacquer wires remaining thermoplastic, be thermally cured.

It is therefore an object of the invention to provide a thermosetting heat bondable lacquer, the resin components of which forming the heat bondable adhesive are preferably perfectly curable by baking at temperatures starting from 180° C., but maximum 220° C., and are cross-linked at temperatures above 200° C. considerably faster and more strongly than the previously known thermosetting heat bondable adhesives and, after curing (cross-linking) at elevated temperatures, have a better dimensional stability and considerably higher heat stability and can be exposed to higher thermal overloads (are more stable to burn out) than the known thermosetting heat bondable adhesives, although of course the basic requirements of storage stability, processability etc. must also be satisfied. This heat bondable lacquer is used preferably for coating prior art heat stable enamelled wires for the purpose of producing thermosetting baking lacquer wires.

It has now been surprisingly found that by using a heat bondable lacquer on the basis of a thermosetting mixture of solutions of a polyhydantoin resin, a polyhydroxy polyether resin (phenoxy resin) and a polyurethane resin thermosetting heat bondable adhesive coatings can be produced on heat stable enamelled wires for coils, which coatings fulfill the above-mentioned requirements considerably better than all previously known heat bondable adhesives.

The thermosetting heat bondable lacquer according to the invention is characterized in that it comprises a solution of a thermosetting mixture in a solvent or mixture of solvents boiling at a temperature in the range of 50° to 230° C., preferably of 130° to 210° C., said thermosetting mixture consisting of—based on the resin solids:

(a) 20° to 80° C. by weight of polyhydantoin resin of linear and/or branched structure and having the formula:

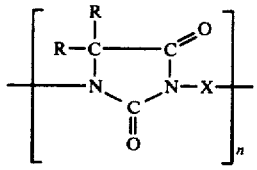

wherein the R's are the same or different and are hydrogen or alkyl radicals containing from 1 to 4 carbon atoms and the X's are the same or different and are aliphatic, cycloaliphatic, heterocyclic and/or aromatic linking groups and n is a positive number having a value corresponding to the specific viscosity, a one percent solution of the resin in cresol DAB V having a specific viscosity between 0.2 and 1.5 at 20° C.

(b) 5 to 65% by weight of polyhydroxy polyether or phenoxy resin of linear and/or branched structure and having the formula:

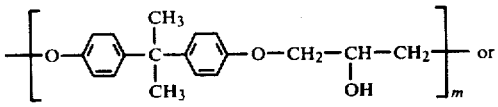

or

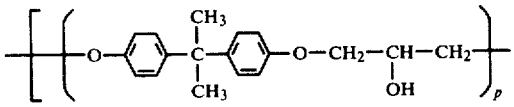

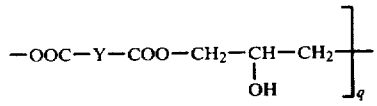

wherein Y is a bivalent aliphatic, cycloaliphatic, heterocyclic and/or aromatic group, m is a positive number having a value corresponding to the specific viscosity, p is a positive number having an average value of 1 to 30 and q is a positive number with a value corresponding to the specific viscosity, a one percent solution of the resin in cresol DAB V having a specific viscosity between 0.2 and 1.5 at 20° C., and (c) 3 to 40% by weight of polyurethane resin of linear and/or branched structure, at least 4% by weight of the resin consisting of the urethane grouping having the formula:

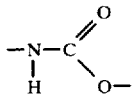

and a one percent solution of the resin in cresol DAB V having a specific viscosity between 0.1 and 1.0 at 20° C.

In the drawings, FIG. 1 represents the ternary system of components a, b and c in the form of a triangular diagram.

The composition of the heat bondable lacquers according to the invention can also be taken from the hatched area in FIG. 1.

FIG. 2 shows a testing arrangement for the determination of the bakability and

FIG. 3 shows a testing arrangement for the determination of the baking strength of heat bondable lacquers.

The heat bondable lacquers according to the invention can be produced by mixing corresponding amounts of a solution of component (a) in a solvent or mixture of solvents, preferably in phenolic solvent or benzyl alcohol or mixtures thereof, optionally with the addition of hydrocarbons which are preferably aromatic, such as xylene, or mixtures thereof, such as Solvesso ® 100, a solution of component (b) in a solvent or mixture of solvents, preferably in a phenolic solvent, benzyl alcohol, N-methylpyrrolidone, dimethylformamide, 2-methoxyethyl acetate or 2-ethoxyethyl acetate or mixtures thereof, optionally with the addition of hydrocarbons which are preferably aromatic, such as xylene, or mixtures thereof, such as Solvesso ® 100, and a solution of component (c) in a solvent or mixture of solvents, preferably in a phenolic solvent, benzyl alcohol or N-methylpyrrolidine, optionally with the addition of hydrocarbons, which are preferably aromatic, such as xylene, or mixtures therof, such as Solvesso ® 100.

The heat bondable lacquer can also contain catalysts which are usual in polyurethane chemistry and/or other auxiliaries and additives such as synthetic resins which are usually employed for modification purposes, e.g. phenolic resins and melamine resins, leveling agents and/or adhesive primers, organic and/or inorganic fillers and dyes. It is preferred to use as catalyst 0.1 to 1.0% by weight of lead acetate.

Suitable polyhydantoin resin components (a) are for example described in German Pat. No. 15,70,552 (Bayer), British Pat. No. 1,420,914 (Bayer), German Offenlegungsschrift No. 17,95,729 (Bayer), German Pat. No. 17,70,131 (Beck) and German Offenlegungsschrift No. 20,54,602 (Beck). The polyhydantoin resins mentioned therein can be used in the heat bondable lacquers according to the invention, provided that their 1% solution is cresol DAB V (cresol according to Deutsches Arzneibuch V) has a specific viscosity between 0.2 and 1.5 at 20° C. Suitable proprietary products are e.g.:

Resistherm PH 10 (Bayer)
Resistherm PH 20 (Bayer)
Polyhydantoin VP L 2324 (Bayer)
Polyhydantoin VP L 8001 (Bayer)
Polyhydantoin VP L 8003 (Bayer)

as well as polyhydantoins containing imide groups as described in the above-mentioned German Offenlegungsschrift No. 17,95,729 (Bayer).

Suitable polyhydroxy polyether resin components (phenoxy resin components) (b) are e.g. the proprietary products Eponol and Epikote (Shell), Phenoxy Resin (Union Carbide) and Epiclone (Dai-Nippon), which can be used in the heat bondable lacquers according to the invention, provided that their 1% solution in cresol DAB V has a specific viscosity between 0.2 and 1.5 at 20° C. Examples of such products are:

Eponol and Epikote types OL-55 and OL-53
Epikote types CH-1401 and CH-1402
Bakelite Phenoxy Resins types PKHH, PKHC and PKHA
Epiclone H 350 as well as polyhydroxy polyether resins containing ester and/or esterimide groups which are produced from bisphenoldiepoxide resins, e.g. Epon 828 and 1001 to 1009 (Shell), and dicarboxylic acids, such as adipic acid, and/or imidedicarboxylic acids, which imidedicarboxylic acids can be prepared, for example, from trimellithic acid anhydride and diamines, preferably 4,4'-diaminodiphenylmethane, or glycocoll.

Suitable polyurethane resin components (c) are e.g. addition products made from at least bivalent isocyanates which can contain imide groups, the isocyanate groups of which can partially be blocked by monovalent compounds with active hydrogen, such as phenols, ε-caprolactam, malonic acid esters, benzyl alcohol or triisopropyl alcohol, and at least bifunctional hydroxy compounds. The fundamentals of the polyurethane chemistry and starting products for the manufacture of polyurethanes are, for example, described in Kunstsoff-Handbuch, Volume VII, "Polyurethane," (Vieweg and Höchtlen), Hauser Verlag München. All soluble polyurethanes can be used in the heat bondable lacquers according to the invention, provided that their 1% solution in cresol DAB V has a specific viscosity between 0.1 and 1.0 at 20° C.

The number of the technically important isocyanates which can be used in the manufacture of such polurethane resins is very large. For example, tolylene-2,4- and/or -2,6-diisocyanate, e.g. Desmodur® T 65, T 80 and T 100 (Bayer), can be considered, as well as dimerized tolylene-2,4-diisocyanate, e.g. Desmodur® TT (Bayer), diphenylmethane-4,4'-diisocyanate, e.g. Desmodur® 44 (Bayer), 1,4-diisocyanatobenzene, e.g. Desmodur® 14 (Bayer), hexamethylene-1,6-diisocyanate, e.g. Desmodur® H (Bayer), naphthylene-1,5-diisocyanate, e.g. Desmodur® 15 (Bayer), triphenylmethane-4,4',4''-triisocyanate, e.g. Desmodur® R (Bayer), trimethylhexamethylene diisocyanate, e.g. TMDI (Veba), isophorone diisocyanate, e.g. IPDI (Veba), a reaction product having isocyanate and urethane groups made from tolylene diisocyanate and a mixture of polyalcohols, e.g. Desmodur® L (Bayer) or, blocked with cresol, Desmodur® AP stabil (Bayer), trimerized tolylene-2,4-diisocyanate, e.g. Suprase® KN (ICI) or, blocked with cresol, Desmodur® CT stabil (Bayer) as well as imide and/or amide group-containing isocyanates such as a reaction product from 2 moles of diphenylmethane diisocyanate and 1 mole of trimellithic acid anhydride.

In the preparation of the above mentioned polyurethane resins, all compounds can be used which contain at least two hydroxy groups, but preferably polyhydric alcohols, such as in particular ethylene glycol, diethylene glycol, triethylene glycol, butanediol, hexanetriol, glycerol, trimethylol propane and tris-(hydroxyethyl-)isocyanurate, polyhydroxy polyesters, especially polyhydroxy polyesters made from an at least dihydric alcohol, such as one of the abovementioned alcohols, and an at least dibasic carboxylic acid, as e.g. adipic acid, phthalic acid, isophthalic acid, terephthalic acid or trimellithic acid, the mole ratio of acid to alcohol being preferably 3:4 to 3:6, and polyhydroxy polyesterimides, preferably those of the type described in Swiss Pat. No. 532,649 and German Offenlegungsschrift No. 24,43,252.

The polyurethane resins are preferably prepared from the said isocyanates and hydroxy compounds at a mole ratio of —NCO to —OH of 4 to 6:5, the reaction (which may optionally be effected in the presence of substances which block isocyanate groups) being carried out so that a 1% solution of the polyurethane resin formed in cresol DAB V has a specific viscosity between 0.1 and 1.0 at 20° C.

The heat bondable lacquer according to the invention can be applied to enamelled copper wires which are preferably heat stable with the aid of a normal wire lacquering machine; to achieve the desired thickness of the adhesive layer, several layers of heat bondable lacquer can be applied, as is common practice in wire lacquering. At a given lacquering speed, the individual heat bondable lacquer coatings can be dried at a considerably lower oven temperature, namely 150° to 200° C., then the base lacquer layers because the base lacquers layers do not only have to be dried, but also to be burnt in. Thus, if one wishes to produce a baking lacquer layer in this way in one step, a lacquering machine with two furnace shafts is required, the temperatures of the shafts being individually adjustable.

All heat-resistant enamelled wires are suitable which conform at least to heat class F; however, preferably the most heat stable qualities (i.e. heat class ≧H) are used, as e.g. wires insulated with polyesterimide, polyamideimide, polyhydantoin or polyimide. Wires which have two insulating layers, e.g. polyesterimide as base layer and polyamide-imide as covering layer, can also be used.

However, not only enamelled wires but also wires which are insulated in a different way, e.g. wires braided with glass filaments or insulated with insulating tape, can be coated with the heat bondable lacquer according to the invention. In principle, wires with any cross-section (fine to coarse) and profile (round or flat) can be coated. The metal core of the wires can consist of various materials, e.g. copper, aluminum or also materials with high specific resistance. The heat bondable lacquer according to the invention can, however, also be applied to other carrier materials such as plastic films or sheets, metal foils, glass filaments, mica paper and polyamide paper, e.g. Nomex® (Du Pont).

By precipitation in a non-solvent, preferably water, heat bondable adhesive powders can be produced from the heat bondable lacquer according to the invention.

The preparation of synthetic resin solutions which can be used in the production of the heat bondable lacquers according to the invention, is described below.

A. Polyhydantoin Resin Solutions

Solution A 1

100 parts by weight of a 32% solution of Resistherm PH 10 (Bayer) in cresol are mixed with 60 parts by weight of xylene, while being well stirred.

| | |
|---|---|
| Solids content | 20% |
| Viscosity at 20° C. | 2200 mPas |
| Specific viscosity, 1% solution in cresol DAB V at 20° C. | 0.95 |

Solution A 2

100 parts by weight of 32% solution of Resistherm PH 20 (Bayer) in cresol are mixed with 60 parts by weight of xylene, while being well stirred.

| | |
|---|---|
| Solids content | 20% |
| Viscosity at 20° C. | 380 mPas |
| Specific viscosity, 1% solution in cresol DAB V at 20° C. | 0.45 |

Solution A 3

300 parts by weight of cresol DAB V and 300 parts by weight of xylene are filled into a flask with stirrer and thermometer, and then heated to about 100° C. While stirring, 200 parts by weight of Polyhydantoin VP L 2324 (Bayer) are then added. As soon as the resin has dissolved, i.e. after about 2 hours, the solution is cooled.

| | |
|---|---|
| Solids content | 20% |
| Viscosity at 20° C. | 150 mPas |
| Specific viscosity, 1% solution in cresol DAB V at 20° C. | 0.41 |

B. POLYHYDROXY POLYETHER RESP. PHENOXY RESIN SOLUTIONS

Solution B 1

400 parts by weight of cresol DAB V and 400 parts by weight of xylene are filled into a flask with stirrer and thermometer, and then heated to about 130° C.

While stirring, 200 parts by weight of Epikote 1401 (Shell) are then added. As soon as the resin has dissolved, i.e., after 2 hours, the solution is cooled.

| | |
|---|---|
| Solids content | 20% |
| Viscosity at 20° C. | 1600 mPas |
| Specific viscosity, 1% solution in cresol DAB V at 20° C. | 0.86 |

Solution B 2

One proceeds as for Solution B 1, using Epikote 1402 (Shell) instead of the Epikote 1401.

| | |
|---|---|
| Solids content | 20% |
| Viscosity at 20° C. | 450 mPas |
| Specific viscosity, 1% solution in cresol DAB V at 20° C. | 0.62 |

Solution B 3

100 parts by weight of Eponol 55-L32 (Shell) are well mixed under stirring with 60 parts by weight of cresol DAB V.

| | |
|---|---|
| Solids content | 20% |
| Viscosity at 20° C. | 5100 mPas |
| Specific viscosity, 1% solution in cresol DAB V at 20° C. | 0.92 |

Solution B 4

100 parts by weight of Eponol 53-L-32 (Shell) are mixed under stirring with 60 parts by weight of cresol DAB V.

| | |
|---|---|
| Solids content | 20% |
| Viscosity at 20° C. | 4700 mPas |
| Specific viscosity, 1% solution in cresol DAB V at 20° C. | 0.72 |

Solution B 5

One proceeds as for solution B 1, but using phenoxy Resin PKHH (Union Carbide) instead of Epikote 1401.

| | |
|---|---|
| Solids content | 20% |
| Viscosity at 20° C. | 1200 mPas |
| Specific viscosity, 1% solution in cresol DAB V at 20° C. | 0.60 |

C. POLYURETHANE RESIN SOLUTIONS

Solution C 1

800 parts by weight of cresol DAB V, 4 parts by weight of lead acetate trihydrate, 262.5 parts by weight of triethylene glycol, 130.5 parts by weight of tris(hydroxyethyl)-isocyanurate, 112.5 parts by weight of glycocoll and 288 parts by weight of trimellithic acid anhydride are charged in this order into a reaction vessel provided with a stirrer and a descending cooler. While being stirred, the mixture is heated so that a temperature of 200° C. is reached in approximately 4 hours. The temperature is adjusted so that as much water as possible, but little cresol is distilled, by keeping the distillation temperature below 110° C. The reaction is completed after about 8 hours at 200° to 210° C. and the mixture is allowed to cool. The yield is about 1450 parts by weight of esterimide resin solution. 485 parts by weight of Solvesso 100 (Esso) are added thereto, the mixture is heated, while stirring, to 110° C., and 2 to 5% of volatile components, mainly water, are distilled off under slightly reduced pressure. After complete dehydration, 250 parts by weight of p,p'-diphenylmethane diisocyanate are added, while stirring, and the vessel is sealed. The exothermic reaction which commences causes a temperature increase from about 110° C. to about 127° C.; the mixture is allowed to react further for about 30 minutes at this temperature. The mixture is then diluted with 1590 parts by weight of cresol DAB V and 1090 parts by weight of Solvesso 100.

| | |
|---|---|
| Solids content | 20% |
| Viscosity at 20° C. | 135 mPas |
| Specific viscosity, 1% solution in cresol DAB V at 20° C. | 0.31 |
| NHCOO-content of the resin solids about | 12% by weight |

Solution C 1.1

One proceeds as for solution C 1 but adds the p,p'-diphenylmethane diisocyanate at 135° C. instead of at 110° C. The exothermic reaction which commences then causes a temperature increase from about 135° C. to about 150° C.; the mixture is allowed to react further for about 15 minutes at this temperature and is then cooled as quickly as possible to below 100° C.

| | |
|---|---|
| Solids content | 20% |
| Viscosity at 20° C. | 900 mPas |
| Specific viscosity, 1% solution in cresol DAB V at 20° C. | 0.67 |
| NHCOO-content of the resin solids about | 12% by weight |

Solution C 2

240 parts by weight of dehydrated N-methylpyrrolidone and 150 parts by weight of dehydrated triethylene glycol are charged into a reaction vessel provided with a stirrer and a descending cooler. While being stirred, the charge is heated to 150° C. and at intervals of 15 minutes, 5 portions of 50 parts by weight of p,p'-diphenylmethane diisocyanate are added. The exothermic reaction commencing at each addition causes an increase in the temperature of the charge by 10° to 15° C.; between the additions of the portions, the charge is cooled again to 150° C. After the addition of the 5th portion, the charge is heated to 170° C. and allowed to react further for 15 minutes; it is then diluted with 1350 parts by weight of dehydrated cresol DAB V.

| | |
|---|---|
| Solids content | 20% |
| Viscosity at 20° C. | 2200 mPas |
| Specific viscosity, 1% solution in cresol DAB V at 20° C. | 0.44 |
| NHCOO-content of the resin solids about | 29% by weight |

Solution C 3

62 parts by weight of dehydrated ethylene glycol are charged into a reaction vessel provided with a stirrer and a descending cooler. While being stirred, the mixture is heated to 160° C. and then 50 parts by weight of trimethylhexamethylene diisocyanate are added. The exothermic reaction which commences causes a temperature rise to about 190° C. The composition is allowed to react further for 15 minutes while simultaneously cooling to 170° C. At intervals of 15 minutes, 4 portions of 40 parts by weight of trimethylhexamethylene diisocyanate are then added. The exothermic reaction which commences causes each time a renewed increase in the temperature of the product by 10° to 20° C.; therefore the mixture is cooled again to 170° C. between the additions of the portions. When the 15 minutes reaction time after the addition of the 4th portion has lapsed, the charge is cooled to about 120° C. and diluted with 950 parts by weight of cresol DAB V.

| | |
|---|---|
| Solids content | 20% |
| Viscosity at 20° C. | 1050 mPas |
| Specific viscosity, 1% solution in cresol DAB V at 20° C. | 0.37 |
| NHCOO-content of the resin solids about | 43% by weight |

Solution C 4

106 parts by weight of dehydrated diethylene glycol are charged into a reaction vessel provided with a stirrer and a descending cooler. While being stirred, the mixture is heated to 160° C. and 50 parts by weight of trimethylhexamethylene diisocyanate are added. The exothermic reaction which commences causes a temperature increase to about 190° C. The mixture is allowed to react further for 15 minutes while simultaneously cooling to 170° C. At intervals of 15 minutes, 4 portions of 40 parts by weight of trimethylhexamethylene diisocyanate are then added. The exothermic reaction which commences causes each time a renewed temperature rise by 10° to 20° C.; therefore the mixture is cooled again to 170° C. between the additions of the portions. Before adding the 4th portion, 130 parts by weight of dehydrated N-methylpyrrolidone are added. When the 15 minute reaction time after the addition of the 4th portion has lapsed, the charge is cooled to about 120° C. and diluted with 1150 parts by weight of cresol DAB V.

| | |
|---|---|
| Solids content | 20% |
| Viscosity at 20° C. | 580 mPas |
| Specific viscosity, 1% solution in cresol DAB V at 20° C. | 0.16 |
| NHCOO-content of the resin solids about | 37% by weight |

Solution C 4.1

One proceeds as for solution C 4, without adding the N-methylpyrrolidone. In addition, after completion of the reaction time, the mixture is diluted with 1280 parts by weight of cresol DAB V instead of 1150 parts by weight of cresol DAB V.

| | |
|---|---|
| Solids content | 20% |
| Viscosity at 20° C. | 1100 mPas |
| Specific viscosity, 1% solution in cresol DAB V at 20° C. | 0.41 |
| NHCOO-content of the resin solids about | 37% by weight |

Solution C 5

One proceeds as for solution C 4.1, using 150 parts by weight of dehydrated triethylene glycol instead of 106 parts by weight of dehydrated diethylene glycol and adding, at the end of the reaction, 1415 parts by weight of cresol DAB V instead of 1280 parts by weight of cresol DAB V.

| | |
|---|---|
| Solids content | 20% |
| Viscosity at 20° C. | 950 mPas |
| Specific viscosity, 1% solution in cresol DAB V at 20° C. | 0.40 |
| NHCOO-content of the resin solids about | 33% by weight |

Solution C 6

450 parts by weight of triethylene glycol, 186 parts by weight of ethylene glycol, 6 parts by weight of lead acetate trihydrate, 292 parts by weight of adipic acid, 150 parts by weight of glycocoll and 384 parts by weight of trimellithic acid anhydride are charged in the said order into a reaction vessel provided with a stirrer and a descending cooler. While stirring, the mixture is heated so that a temperature of 220° C. is reached in approximately 6.5 hours. The temperature is adjusted so that as much water as possible, but little ethylene glycol is distilled; the distillation temperature should not exceed 110° C. The excess glycols are then distilled off in vacuo, so that the esterimide resin formed has a hydroxy content of 1.5 to 2%. The mixture is diluted with 1190 parts by weight of 2-methoxyethyl acetate. After the composition has reached a temperature of 115° C., 175 parts by weight of p,p'-diphenylmethane diisocyanate are added. The exothermic reaction which commences causes a temperature increase to about 130° C.; the mixture is allowed to react further for 10 minutes at this temperature. Then it is diluted with 4260 parts by weight of 2-methoxyethyl acetate.

| | |
|---|---|
| Solids content | 20% |
| Viscosity at 20° C. | 60 mPas |
| Specific viscosity, 1% solution in cresol DAB V at 20° C. | 0.33 |
| NHCOO-content of the resin solids about | 6% by weight |

Solution C 7

62 parts by weight of dehydrated ethylene glycol are charged into a reaction vessel provided with a stirrer and a descending cooler. While being stirred, the charge is heated to 150° C. and 24 parts by weight of Desmodur T 65 (Bayer) are added. The exothermic reaction which commences causes a temperature increase to about 185° C. The mixture is allowed to react further for 15 minutes, while it is simultaneously cooled to 170° C. At 15 minute intervals, 6 portions of 25 parts by weight of Desmodur T 65 are then added. The exothermic reaction which commences each time causes a rise in temperature of the charge by 20° to 30°; the temperature is reduced by cooling to 170° C. between the additions of the portions. Before the addition of the 4th and 5th portion, 20 parts by weight and before the addition of the 6th portion 40 parts by weight of dehydrated N-methylpyrrolidone are added. When the reaction time has lapsed, the mixture is diluted with 865 parts by weight of cresol DAB V.

| | |
|---|---|
| Solids content | 20% |
| Viscosity at 20° C. | 1400 mPas |
| Specific viscosity, 1% solution in cresol DAB V at 20° C. | 0.23 |
| NHCOO-content of the resin solids about | 50% by weight |

Solution C 8

106 parts by weight of dehydrated diethylene glycol are charged into a reaction vessel provided with a stirrer and a descending cooler. While being stirred, the charge is heated to 160° C. and 14 parts by weight of Desmodur T 65 (Bayer) are added. The exothermic reaction which commences causes a rise in temperature to about 175° C. The mixture is allowed to react further for 15 minutes while being cooled to 170° C. At 15 minute intervals, 4 portions of 40 parts by weight of Desmodur T 65 are then added. The exothermic reaction which commences each time causes a rise in the temperature of the charge by 30° to 40° C.P; the temperature is adjusted by cooling again to 170° C. between the additions of the portions. Before adding the 4th portion, 100 parts by weight of dehydrated N-methylpyrrolidone are added. When the 15 minutes reaction time after the addition of the 4th portion has lapsed, the mixture is diluted with 1020 parts by weight of dehydrated cresol DAB V.

| | |
|---|---|
| Solids content | 20% |
| Viscosity at 20° C. | 3100 mPas |
| Specific viscosity, 1% solution in cresol DAB V at 20° C. | 0.48 |
| NHCOO-content of the resin solids about | 42% by weight |

Solution C 9

62 parts by weight of dehydrated ethylene glycol are charged into a reaction vessel provided with a stirrer and a descending cooler. While being stirred, the charge is heated to 160° C. and 48 parts by weight of hexamethylene diisocyanate are added. The exothermic reaction which commences causes a temperature increase to about 190° C. The mixture is allowed to react further for 15 minutes while being cooled to 170° C. At 15 minute intervals, 3 portions of 40 parts by weight of hexamethylene diisocyanate are then added. The exothermic reaction which commences each time causes a rise in the temperature of the charge by 10° to 20° C.; the temperature is adjusted to 170° C. by cooling between the addition of the portions. Before adding the 3rd portion, 100 parts by weight of dehydrated N-methylpyrrolidone are added. When the 15 minutes reaction time after the addition of the 3rd portion has lapsed, the charge is cooled to about 120° C. and diluted with 820 parts by weight of cresol DAB V.

| | |
|---|---|
| Solids content | 20% |
| Viscosity at 20° C. | 1350 mPas |
| Specific viscosity, 1% solution in cresol DAB V at 20° C. | 0.45 |
| NHCOO-content of the resin solids | 51% by weight |

Solution C 10

400 parts by weight of N-methylpyrrolidone and 700 parts by weight of xylene are charged into a reaction vessel provided with a stirrer and a descending cooler. While being stirred, the mixture is heated and within about 40 minutes 300 parts by weight of volatile components are distilled off for dehydration. After the charge has been cooled to 80° C., 96 parts by weight of trimellithic acid anhydride and 250 parts by weight of p,p'-diphenylmethane diisocyanate are added. While being stirred, the charge is slowly heated to 140° C.; the $CO_2$ generation is monitored by means of a gas meter connected to the reflux condenser. When 22.4 liters of $CO_2$ have been generated, the charge is cooled to 117° C. and 75 parts by weight of dehydrated triethylene glycol are added. The exothermic reaction which commences causes a temperature increase to about 135° C. The mixture is allowed to react further for 30 minutes at this temperature. It is then diluted with 200 parts by weight of dehydrated cresol DAB V, 285 parts by weight of N-methyl-pyrrolidone and 285 parts by weight of xylene.

| | |
|---|---|
| Solids content | 20% |
| Viscosity at 20° C. | 830 mPas |
| Specific viscosity, 1% solution in cresol DAB V at 20° C. | 0.6 |
| NHCOO-content of the resin solids about | 16% by weight |

Solution C 11

960 parts by weight of trimellithic acid anhydride, 75 parts by weight of glycocoll, 396 parts by weight of diaminodiphenylmethane, 96 parts by weight of ethylene glycol, 150 parts by weight of triethylene glycol, 286 parts by weight of trimethylol propane, 9 parts by weight of lead acetate and 3000 parts by weight of cresol DAB V are charged into a small reaction apparatus provided with a stirrer, a thermometer and a cooler. The mixture is heated while being stirred, so that a temperature of 200° C. is reached in approximately 4 hours. The temperature is adjusted so that as much water as possible but little cresol DAB V is distilled. After the temperature has been maintained at 200° to 210° C. for 8 to 10 hours, the reaction is completed. The mixture is diluted with 1320 parts by weight of cresol DAB V, 1320 parts by weight of 2-methoxyethyl acetate and 2190 parts by weight of xylene. The temperature of the charge is adjusted to 110° C. and 1955 parts by weight of Desmodur AP stabil (Bayer) are added in portions. After the Desmodur AP stabil has dissolved, the mixture is diluted with 2200 parts by weight of cresol DAB V, 485 parts by weight of 2-methoxyethyl acetate and 4000 parts by weight of xylene.

| | |
|---|---|
| Solids content | 20% |
| Viscosity at 20° C. | 60 mPas |
| Specific viscosity, 1% solution in cresol DAB V at 20° C. | 0.15 |
| NHCOO-content of the resin solids about | 8% by weight |

Solution C 11.1

960 parts by weight of trimellithic acid anhydride, 75 parts by weight of glycocoll, 396 parts by weight of diaminodiphenylmethane, 96 parts by weight of ethylene glycol, 150 parts by weight of triethylene glycol, 268 parts by weight of teimethylol propane, 9 parts by weight of lead acetate and 3000 parts by weight of cresol DAB V are charged into a small reaction apparatus provided with a stirrer, a thermometer and a cooler.

The mixture is heated under stirring so that a temperature of 200° C. is reached in approximately 4 hours. The temperature is adjusted so that as much water as possible, but little cresol DAB V is distilled. After the temperature has been maintained at 200° to 210° C. for 8 to 10 hours, the reaction is completed. The mixture is diluted with 1320 parts by weight of cresol DAB V and 2190 parts by weight of xylene. After the charge has reached a temperature of 150° C., 1955 parts by weight of Desmodur AP stabil (Bayer) are added and allowed to react for about 20 minutes at 140° C. The mixture is then diluted with 2200 parts by weight of dehydrated cresol DAB V, 1805 parts by weight of 2-methoxyethylacetate and 4000 parts by weight of xylene.

| | |
|---|---|
| Solids content | 20% |
| Viscosity at 20° C. | 800 mPas |
| Specific viscosity, 1% solution in cresol DAB V at 20° C. | 0.58 |
| NHCOO-content of the resin solids about | 8% by weight |

Examples 1.1 to 1.8

The above-described solutions were mixed in the amounts given in Table I in order to prepare heat bondable lacquers according to the invention. Baking lacquer wires were produced as described below with these heat bondable lacquers in order to determine the properties also given in Table I in the way described further below. The Examples are also entered into FIG.

TABLE I

| Example No. | Composition: Polyhydantoin resin solution 20% No. | % by weight | Phenoxy resin solution 20% No. | % by weight | Polyurethane resin solution 20% No. | % by weight |
|---|---|---|---|---|---|---|
| 1.1 | A 1 | 75 | B 1 | 20 | C 1 | 5 |
| 1.2 | " | 75 | " | 12.5 | " | 12.5 |
| 1.3 | " | 75 | " | 5 | " | 20 |
| 1.4 | " | 70 | " | 24 | " | 6 |
| 1.5 | " | 50 | " | 45 | " | 5 |
| 1.6 | " | 50 | " | 40 | " | 10 |
| 1.7 | " | 50 | " | 25 | " | 25 |
| 1.8 | " | 30 | " | 56 | " | 14 |
| 1.9 | " | 30 | " | 35 | " | 35 |
| 1.10 | A 2 | 50 | " | 40 | " | 10 |
| 1.11 | A 3 | 50 | " | 40 | " | 10 |
| 1.12 | A 1 | 50 | B 2 | 40 | " | 10 |
| 1.13 | " | 50 | B 3 | 40 | " | 10 |
| 1.14 | " | 50 | B 4 | 40 | " | 10 |
| 1.15 | " | 50 | B 5 | 40 | " | 10 |
| 1.16 | A 1 | 50 | B 1 | 40 | C 2 | 10 |
| 1.17 | " | 50 | " | 40 | C 3 | 10 |
| 1.18 | " | 50 | " | 40 | C 4 | 10 |
| 1.19 | " | 50 | " | 40 | C 4.1 | 10 |
| 1.20 | " | 50 | " | 40 | C 5 | 10 |
| 1.21 | " | 50 | " | 40 | C 6 | 10 |
| 1.22 | " | 50 | " | 40 | C 7 | 10 |
| 1.23 | " | 50 | " | 40 | C 8 | 10 |
| 1.24 | " | 50 | " | 40 | C 9 | 10 |
| 1.25 | " | 50 | " | 40 | C 10 | 10 |
| 1.26 | " | 50 | " | 40 | C 11 | 10 |
| 1.27 | " | 50 | " | 40 | C 11.1 | 10 |
| 1.28 | " | 50 | " | 33 | C 6 | 17 |

TABLE I

| Example No. | Properties: Speed range (ΔV) m/min | Bakable in 30 mins. at °C. | Minimum curing time in minutes at 180° C. | 220° C. | after baking 30 minutes/220° C.: Bonding strength in N at 20° C. | 160° C. | 200° C. | Yield stress limit for >1 hour N at 160° C. | 200° C. |
|---|---|---|---|---|---|---|---|---|---|
| 1.1 | 15 | 100 | — | 15 | 104 | 55 | 25 | 35 | 3 |
| 1.2 | 10 | 220 | — | 10 | 105 | 60 | 27 | 33 | 5 |
| 1.3 | 5-10 | 220 | — | 10 | 110 | 52 | 22 | 34 | 3 |
| 1.4 | 15 | 200 | — | 15 | 120 | 61 | 30 | 30 | 3 |
| 1.5 | 15 | 180 | 120 | 15 | 126 | 45 | 25 | 16 | 3 |
| 1.6 | 10-15 | 180 | 120 | 10 | 140 | 50 | 28 | 17 | 4 |
| 1.7 | 5-10 | 220 | — | 10 | 115 | 42 | 22 | 11 | 3 |
| 1.8 | 10 | 180 | 120 | 20 | 120 | 30 | 10 | 6 | 2 |
| 1.9 | 5 | 220 | — | 10 | 125 | 43 | 28 | 5 | 3 |
| 1.10 | 10-15 | 180 | 120 | 10 | 135 | 48 | 27 | 15 | 4 |
| 1.11 | 10-15 | 180 | 120 | 10 | 125 | 47 | 29 | 16 | 3 |
| 1.12 | 10-15 | 180 | 120 | 10 | 120 | 46 | 28 | 17 | 3 |
| 1.13 | 10-15 | 180 | 120 | 10 | 132 | 52 | 30 | 17 | 4 |
| 1.14 | 10-15 | 180 | 120 | 10 | 126 | 48 | 25 | 16 | 3 |
| 1.15 | 10-15 | 180 | 120 | 10 | 137 | 52 | 30 | 17 | 4 |
| 1.16 | 10-15 | 180 | 150 | 8 | 142 | 50 | 34 | >37 | 13 |
| 1.17 | 10-15 | 180 | 90 | 5 | 127 | 63 | 42 | 32 | 16 |
| 1.18 | 10-15 | 180 | 120 | 10 | 143 | 62 | 40 | 32 | 10 |
| 1.19 | 10-15 | 180 | 120 | 10 | 142 | 63 | 40 | 32 | 12 |
| 1.20 | 10-15 | 180 | 120 | 10 | 148 | 51 | 36 | 32 | 10 |
| 1.21 | 15 | 180 | 120 | 20 | 110 | 38 | 12 | 8 | 2 |
| 1.22 | 10-15 | 180 | 90 | 5 | 140 | 74 | 50 | >37 | 15 |
| 1.23 | 10-15 | 180 | 120 | 7 | 128 | 71 | 44 | >37 | 14 |
| 1.24 | 10-15 | 180 | 90 | 5 | 130 | 59 | 37 | 33 | 16 |
| 1.25 | 5-7 | 220 | — | 10 | 110 | 54 | 30 | 27 | 8 |
| 1.26 | 5-10 | 180 | 120 | 10 | 122 | 48 | 18 | 16 | 4 |
| 1.27 | 5-10 | 180 | 120 | 10 | 117 | 55 | 21 | 21 | 5 |
| 1.28 | 10-15 | 180 | 120 | 10 | 117 | 45 | 21 | 13 | 4 |

Comparative Examples 2.1 to 2.13

The solutions described above were mixed in the amounts given in Table II in order to prepare comparative heat bondable lacquers. Baking lacquer wires were also produced with these comparative lacquers in the way described below, in order to determine the properties also given in Table II in the way described further below. The comparative Examples are also entered into FIG. 1.

TABLE II

| Comparative Example No. | Composition: Polyhydantoin resin solution 20% No. | % by weight | Phenoxy resin solution 20% No. | % by weight | Polyurethane resin solution 20% No. | % by weight |
|---|---|---|---|---|---|---|
| 2.1 | A 1 | 50 | B 1 | 17 | C 1 | 33 |
| 2.2 | " | 50 | " | 10 | " | 40 |
| 2.3 | " | 30 | " | 14 | " | 56 |
| 2.4 | " | 10 | " | 72 | " | 18 |
| 2.5 | " | 10 | " | 45 | " | 45 |
| 2.6 | " | 10 | " | 18 | " | 72 |
| 2.7 | " | 70 | " | 30 | — | — |
| 2.8 | " | 50 | " | 50 | — | — |
| 2.9 | " | 30 | " | 70 | — | — |
| 2.10 | " | 100 | — | — | — | — |
| 2.11 | — | — | B 1 | 100 | — | — |
| 2.12 | — | — | — | — | C 1 | 100 |
| 2.13 | — | — | B 1 | 80 | " | 20 |

| Comparative Example No. | Speed range (ΔV) m/min | Bakable in 30 mins. at °C. | Minimum curing time in mins. at 180° C. | 220° C. (250° C.) | Properties: after baking 30 Min./220° C. (10 Min./250° C.) Bonding strength in N at 20° C. | 160° C. | 200° C. | Yield stress limit for >1 hour in N at 160° C. | 200° C. |
|---|---|---|---|---|---|---|---|---|---|
| 2.1 | 3 | 250 | — | (5-10) | (100) | (35) | (16) | (12) | (3) |
| 2.2 | 2 | 250 | — | (5-10) | (95) | (30) | (7) | (11) | (2) |
| 2.3 | 2 | 250 | — | (5-10) | (110) | (35) | (4) | (5) | (2) |
| 2.4 | 15 | 170 | 120 | 30 | 95 | 6 | 4 | 3 | 2 |
| 2.5 | 5 | 250 | — | (5-10) | (90) | (8) | (3) | (3) | (2) |
| 2.6 | 2 | 250 | — | (5-10) | (95) | (10) | (4) | (3) | (2) |
| 2.7 | 10-15 | 220 | — | 30 | 105 | 40 | 22 | 12 | 2 |
| 2.8 | 10-15 | 180 | >300 | >60 | 110 | 18 | 7 | <4 | <1 |
| 2.9 | >15 | 180 | >300 | >60 | 90 | 4 | 2 | <1 | <1 |
| 2.10 | 10-15 | 250 | — | (ca.5) | (120) | (65) | (46) | (>36) | (12) |
| 2.11 | >15 | <160 | >300 | >60 | 75 | 2 | <1 | <1 | <1 |
| 2.12 | 10-15 | 200 | — | >60 | 100 | 8 | 3 | 2 | <1 |
| 2.13 | 10-15 | 170 | 120 | 30 | 86 | 6 | 4 | 3 | 2 |

Example 2.13 = Example 2 from German Offenlegungsschrift No. 24,43.252

Determination of the Properties

To determine the properties given in Tables I and II, a copper wire enamelled with a polyesterimide of heat class H, the thickness of the polyesterimide layer corresponding to Application Class $C_1$ according to Norm Sheet No. 23745 (1967) of the Verein Schweizerischer Maschinenindustrieller (Kirchweg 4, P.O.Box, Zürich; called VSM in the following) and the corresponding Application Class 1 according to Publication No. 182 (1964) of CEI, was lacquered with the various heat bondable lacquers until Application Class $C_2$ according to VSM and 2 according to CEI was reached. The dimensions of the baking lacquer wires measured were: Diameter of the bare copper wire:

$$d=0.40 \text{ mm}$$

Diameter over the polyesterimide insulation:

$$d_1=0.433\pm0.002 \text{ mm}$$

Diameter over the heat bondable adhesive layer:

$$d_2=0.460\pm0.002 \text{ mm}$$

The heat bondable lacquers were applied with a wire lacquering machine with a jet application system and vertical drying oven into the wire insulated with esterimide lacquer. The jet was adjusted so that the above mentioned 27 μm ($d_2$–$d_1$) of heat bondable adhesive were applied on average in three passages. The drying oven was 2.5 m long; its temperature was 80° C. in the inlet zone and 300° C. in the outlet zone.

Determination of the Speed Range

When applying the heat bondable lacquers, the lacquering speed was varied while all other conditions remained the same. At speeds between 15 m/min and 50 m/min wire samples were taken and examined in order to determine the speed range ΔV (m/min). The speed range is the range of speed in which the layer of heat bondable adhesive applied is properly dried, i.e. that it is and remains resistant to winding and bakable. If the drying is not sufficient, the wires coated with heat bondable adhesive can in extreme cases already stick together on the roll or they do not remain "resistant to winding", i.e. the lacquer layer detaches itself during winding. If the drying is too strong, the heat bondable adhesive is no longer bakable, i.e. it is already partially or completely cross-linked. Suitable heat bondable lacquers should have a speed range ΔV of at least 5 m/min. Only wires which were optimally dried, were used for the following tests.

Determination of the Bakability

To test the bakability, mandrel coils with an inside diameter of 6.3 mm and a length of about 75 mm were baked on a mandrel of 6.3 mm diameter under a load by supplying heat. The testing arrangement is shown in FIG. 2, wherein 1 is an annular weight of 75 g, 2 is the mandrel coil and 3 is the support device. The baking strength was tested in the arrangement according to FIG. 3, which is described in CEI Publication 290 (1969), the baked mandrel coil again bearing the numeral 2.

Determination of the Minimum Curing Time

The minimum curing time in minutes at 180°, 220° and 250° C. was determined by loading the mandrel coils which had been baked for varying lengths of time at the respective temperature, for one hour with K=2N in the testing arrangement according to FIG. 3 at 200° C. The minimum curing time is the shortest baking time at which the mandrel coils in this test neither break apart nor are deflected by more than 1 mm.

Determination of the Bonding Strength

The bonding strength is that force which must be temporarily applied at the temperature given to pull apart a baked mandrel coil in the testing arrangement according to FIG. 3.

Determination of the Yield Stress Limit

The yield stress limits were determined by loading a baked mandrel coil with various forces K at the given temperature in the testing arrangement according to FIG. 3. The yield stress limit is the largest force K, with which the mandrel coil can be loaded for at least one hour without breaking apart or being deflected by more than 1 mm.

Determination of the Thermal Shock Resistance

The thermal shock resistance was determined by the method described in CEI Publication 251.1 (1968). It is given in the following table III for copper wires having a polyesterimide resin-base insulation which are coated with various heat bondable lacquers according to the invention and with a comparative heat bondable lacquer, respectively, as well as for copper wires having a polyesterimide resin-base insulation which are impregnated with an esterimide-impregnating lacquer of heat class H.

Determination of the Twist Life

The twist life at 250° and 300° C. was determined according to the method described in CEI-Publication 172 (1966). It is also given in the following table III for copper wires having a polyesterimide resin-base insulation which are coated with various heat bondable lacquers according to the invention and with a comparative heat bondable lacquer, respectively, as well as for copper wires having a polyesterimide resin-base insulation which are impregnated with an esterimide-impregnating lacquer of heat class H.

From tables I to III, the technical progress which is achieved with the heat bondable lacquers according to the invention is unmistakably seen.

TABLE III

| | Thermal Properties | | |
|---|---|---|---|
| | Thermal Shock Resistance, good at the single diameter (d) at | Twist-Life in hours at 300° C. | Twist-Life in hours at 250° C. |
| Copper wire insulated with polyesterimide resin d 0.40 mm $d_1$ 0.433 ± 0.002 mm | 220° C. | 130 | 1050 |
| Copper wire insulated with polyesterimide resin, d and $d_1$ as above, lacquered over with lacquer of Example 1.6 $d_2$ 0.460 ± 0.002 mm | 250° C. | 207 | 1850 |
| Copper wire insulated with polyesterimide resin, d and $d_1$ as above, lacquered over with lacquer of Example 1.17 $d_2$ 0.460 ± 0.002 mm | 250° C. | 225 | 1790 |
| Copper wire insulated with polyesterimide resin, d and $d_1$ as above, lacquered over with lacquer of Example 1.23 $d_2$ 09.460 ± 0.002 mm | 250° C. | 216 | 1920 |
| Copper wire insulated with polyesterimide resin, d and $d_1$ as above, lacquered over with lacquer of Comparative Example 2.13 (Example 2 of German Offenlegungsschrift No. 24,43,252) | 220° C. | 113 | 1364 |
| Copper wire insulated with polyesterimide resin, d and $d_1$ as above, impregnated with lacquer SIB 759 (esterimide impregnating lacquer of heat class H) | — | 108 | 896 |

What is claimed is:

1. Thermosetting heat bondable lacquer which comprises a solution of a thermosetting mixture in a liquid selected from the group consisting of solvents boiling at a temperature in the range of 50° to 230° C. and mixtures of such solvents, said thermosetting mixture consisting of—based on the resin solids—

(a) 20 to 80% by weight of polyhydantoin resin of linear, branched or mixed linear and branched structure and having the formula:

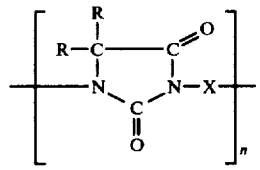

wherein the R's are the same or different and are hydrogen or alkyl radicals containing from 1 to 4 carbon atoms and the X's are the same or different and are selected from the group consisting of aliphatic, cycloaliphatic, heterocyclic and aromatic linking groups and combinations thereof, and n is a positive number having a value corresponding to the specific viscosity, a one percent solution of the resin in cresol DAB V having a specific viscosity between 0.2 and 1.5 at 20° C., (b) 5 to 65% by weight of polyhydroxy polyether or phenoxy resin of linear, branched or mixed linear and branched structure and having the formula:

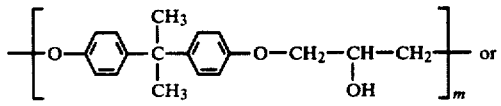

or

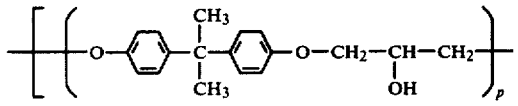

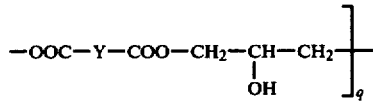

wherein Y is a *bivalent* linking group selected from the group consisting of [bivalent] aliphatic, cycloaliphatic, heterocyclic and aromatic groups and combinations thereof, m is a positive number having a value corresponding to the specific viscosity, p is a positive number having an average value of 1 to 30 and q is a positive number with a value corresponding to the specific viscosity, a one percent solution of the resin in cresol DAB V having a specific viscosity between 0.2 and 1.5 at 20° C., and (c) 3 to 40% by weight of polyurethane resin of linear, branched or mixed linear and branched structure, at least 4% by weight of the resin consisting of the urethane grouping having the formula:

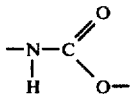

and a one percent solution of the resin in cresol DAB V having a specific viscosity between 0.1 and 1.0 at 20° C. *the composition of said heat bondable lacquer falling within only the hatched area of FIG. 1.*

2. Heat bondable lacquer according to claim 1 which also comprises one or more additional components selected from the group consisting of catalysts and other auxiliaries and additives selected from the group consisting of synthetic resins serving for modification purposes, leveling agents and adhesive primers and mixtures thereof, organic and inorganic fillers and mixtures thereof, and dyes.

3. Heat bondable lacquer according to claim 1 or 2, wherein component (c) is an addition product made from (A) at least bivalent isocyanates which can contain imide groups, the isocyanate groups of which can be partially blocked by monovalent compounds with active hydrogen, and (B) at least bifunctional hydroxy compounds.

4. Heat bondable lacquer according to claim 1 or 2, wherein component (c) is an addition product made from (A) the group consisting of hexamethylene-1,6-diisocyanate, triphenylmethane-4,4',4''-triisocyanate, tolylene-2,4-diisocyanate, tolylene-2,6-diisocyanate, dimerized tolylene-2,4-diisocyanate, 1,4-diisocyanatobenzene, naphthylene-1,5-diisocyanate, diphenylmethane-4,4-diisocyanate, trimethyl-hexamethylene diisocyanate, isophorone diisocyanate and a mixture of tolylene-2,4-diisocyanate and tolylene-2,6-diisocyanate, and (B) an at least bifunctional hydroxy compound.

5. Heat bondable lacquer according to claim 1 or 2 wherein component (c) is an addition product made from (a) at least bivalent isocyanates which can contain imide groups, the isocyanate groups of which can be partially blocked by monovalent compounds with active hydrogen, and (b) an at least bifunctional hydroxy compound selected from the group consisting of (1) at least dihydric alcohols, (2) polyhydroxy polyesterimides, and (3) polyhydroxy polyesters made from an at least dihydric alcohol and an at least dibasic carboxylic acid the mole ratio of acid to alcohol being preferably from 3:4 to 3:6.

6. Heat bondable lacquer according to claim 3 wherein component (c) is the polyaddition product made from isocyanates and hydroxy compounds in a mole ratio of isocyanate groups to hydroxy groups of 4 to 6:5.

7. Heat bondable lacquer according to claim 2 which contains 0.1 to 1.0% by weight of a catalyst which is lead acetate.

8. Process for the preparation of a heat bondable lacquer which comprises the steps of mixing a solution of (a) 20 to 80% by weight of polyhydantoin resin of linear, branched or mixed linear and branched structure and having the formula:

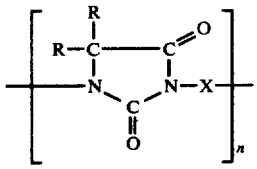

wherein [The] *the* R's are the same or different and are hydrogen or alkyl radicals containing from 1 to 4 carbon atoms and the X's are the same or different and are selected from the group consisting of aliphatic, cycloaliphatic, heterocyclic and aromatic linking groups and combinations thereof, and n is a positive number having a value corresponding to the specific viscosity, a one percent solution of the resin in cresol DAB V having a specific viscosity between 0.2 and 1.5 at 20° C., in a first solvent, a solution of (b) 5 to 65% by weight of polyhydroxy polyether or phenoxy resin of linear, branched or mixed linear and branched structure and having the formula:

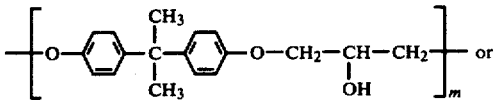

or

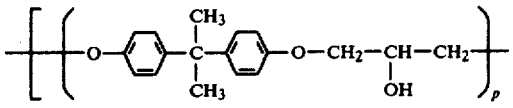

-continued

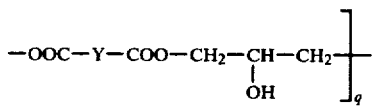

wherein Y is a bivalent linking group selected from the group consisting of aliphatic, cycloaliphatic, heterocyclic and aromatic groups and combinations thereof, m is a positive number having a value corresponding to the specific viscosity, p is a positive number having an average value of 1 to 30 and q is a positive number with a value corresponding to the specific viscosity, a one percent solution of the resin in cresol DAB V having a specific viscosity between 0.2 and 1.5 at 20° C., in a second solvent mixture of solvents, preferably in a phenolic solvent, benzyl alcohol, N-methylpyrrolidone, dimethylformamide, 2-methoxyethyl acetate or 2-ethoxyethyl acetate or mixtures thereof, optionally with the addition of hydrocarbons which are preferably aromatic, such as xylene, or mixtures thereof, and a solution of (c) 3 to 40% by weight of polyurethane resin of linear, branched or mixed linear and branched structure, at least 4% by weight of the resin consisting of the urethane grouping having the formula:

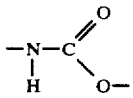

a one percent solution of the resin in cresol DAB V having a specific viscosity between 0.1 and 1.0 at 20° C., in a third solvent, the weight percentages being based on the weight of the total resin solids *and the resin composition of said heat bondable lacquer falling only within the hatched area of FIG. 1.*

9. Process according to claim 8, which comprises also adding materials selected from the group consisting of catalysts, other auxiliaries and additives such as (a) synthetic resins serving for modification purposes, (b) leveling agents and adhesive primers and mixtures thereof, (c) organic fillers and inorganic fillers and mixtures thereof, and (d) dyes.

10. Heat bondable lacquer according to claim 3 wherein said monovalent compounds with active hydrogen are selected from the group consisting of phenols, ε-caprolactam, malonic acid esters, benzyl alcohol and triisopropyl alcohol.

11. Heat bondable lacquer according to claim 4 wherein said at least bifunctional hydroxy compound is selected from the group consisting of at least dihydric alcohols, polyhydroxy polyesterimides, and polyhydroxy polyesters formed from an at least dihydric alcohol and an at least dibasic carboxylic acid wherein the mole ratio of acid to alcohol is preferably from 3:4 to 3:6.

12. Heat bondable lacquer according to claim 5 wherein said monovalent compounds with active hydrogen are selected from the group consisting of phenols, ε-caprolactam, malonic acid esters, benzyl alcohol and triisopropyl alcohol, said at least dihydric alcohols are selected from the group consisting of ethylene glycol, diethylene glycol, triethylene glycol, butanediol, hexanetriol, glycerol, trimethylol propane and tris-(hydroxyethyl)isocyanurate, and said dibasic carboxylic acid is selected from the group consisting of adipic acid, phthalic acid, isophthalic acid, terephthalic acid and trimellithic acid.

13. Heat bondable lacquer according to claim 12 wherein said at least dihydric alcohols are selected from the group consisting of ethylene glycol, diethylene glycol, triethylene glycol, butanediol, hexanetriol, glycerol, trimethylol propane and tris-(hydroxyethyl-)isocyanurate, and said dibasic carboxylic acid is selected from the group consisting of adipic acid, phthalic acid, isophthalic acid, terephthalic acid and trimellithic acid.

14. Heat bondable lacquer according to claim 4 wherein component (c) is the polyaddition product made from isocyanates and hydroxy compounds in a mole ratio of isocyanate groups to hydroxy groups of 4 to 6:5.

15. Heat bondable lacquer according to claim 5 wherein component (c) is the polyaddition product made from isocyanates and hydroxy compounds in a mole ratio of isocyanate groups to hydroxy groups of 4 to 6:5.

16. Heat bondable lacquer according to claim 9 which contains 0.1 to 1.0% by weight of a catalyst which is lead acetate.

17. Process for the preparation of a heat bondable lacquer according to claim 8 wherein said first solvent is selected from the group consisting of phenolic solvents and benzyl alcohol and mixtures thereof, optionally with the addition of aromatic hydrocarbons, said second solvent being selected from the group consisting of phenolic solvents, benzyl alcohol, N-methylpyrrolidone, dimethylformamide, 2-methoxyethyl acetate and 2-ethoxyethyl acetate and mixtures thereof, optionally with the addition of aromatic hydrocarbons, said third solvent being selected from the group consisting of phenolic solvents, benzyl alcohol and N-methylpyrrolidone, optionally with the addition of aromatic hydrocarbons.

* * * * *